Patented Nov. 18, 1924.

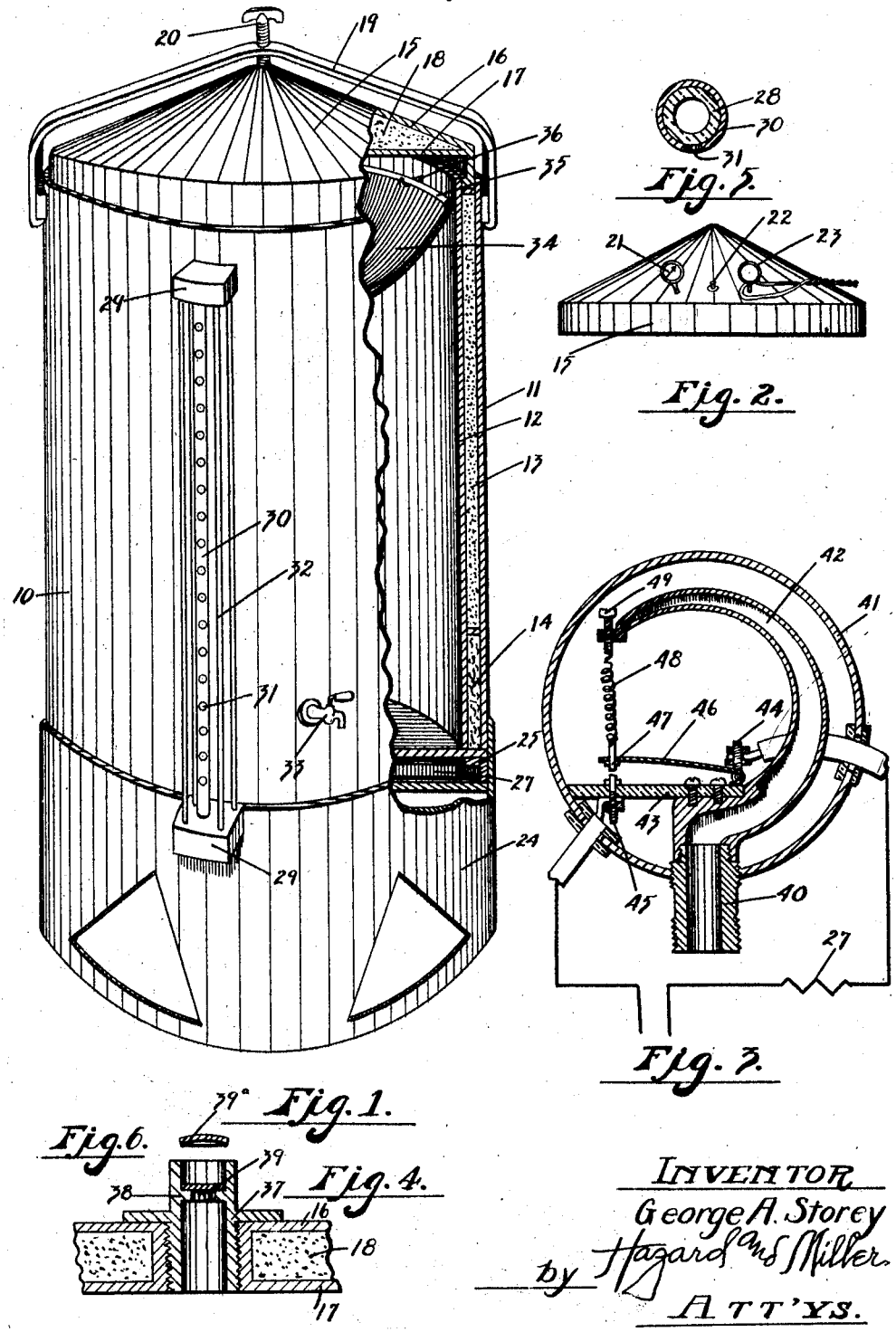

1,515,800

UNITED STATES PATENT OFFICE.

GEORGE A. STOREY, OF HOLTVILLE, CALIFORNIA.

ELECTRIC CONDENSER COFFEE URN.

Application filed September 25, 1923. Serial No. 664,653.

*To all whom it may concern:*

Be it known that I, GEORGE A. STOREY, a citizen of the United States, residing at Holtville, in the county of Imperial and State of California, have invented new and useful Improvements in Electric Condenser Coffee Urns, of which the following is a specification.

My invention relates to improvements in coffee urns and has for its object to provide a coffee urn of simple and practical construction. Another object is to provide a coffee urn which will operate under internal pressure, having suitable safety appliances guarding against the destruction of the urn. Another object is to provide a coffee urn with an electric heating element operating in connection with an automatic cut-out.

With the foregoing and other objects in view, my invention consists of the features of construction and combination and arrangement of parts hereinafter more fully described and claimed, reference being made to the accompanying drawing, in which:

Figure 1 is a perspective and partial section of the coffee urn.

Fig. 2 is a view in elevation of the rear of the coffee urn cover.

Fig. 3 is a vertical section of the automatic electric cut-out, used in connection with the coffee urn, including the electric circuit diagram.

Fig. 4 is a vertical section of the safety valve.

Fig. 5 is a horizontal section of the gauge glass.

Fig. 6 shows the safety valve before insertion.

Referring by numerals to the drawing in which similar numerals refer to similar parts, my invention consists of a container 10 having double walls 11 and 12, between which is an insulative material 13, such as sawdust, ground cork or the like, and a lower portion of insulative material 14 of asbestos.

A hollow removable cover 15 is provided, having plates 16 and 17 between which is insulation 18. The cover 15 is held tightly in place by means of a clamp 19 having a hand screw 20 used to force the cover 15 into the seat provided in the top edge of the wall of the container 10. On the rear of the cover are mounted a pressure gauge 21, a safety valve 22 and the automatic cut-out 23, hereafter more fully described.

The container rests within a base 24 upon a shoulder 25. Directly beneath the container bottom 26 is mounted an electrical heating element 27, connected in series with the automatic cut-out 23, as is plainly shown in Figure 3.

The amount of coffee within the container can be readily determined at any time by means of a gauge glass 28 which has suitable connecting fixtures 29 with the container, and which gauge is surrounded by a metal guard 30 having perforations 31. The gauge glass is also protected by rods 32 which are fastened to the connecting fittings 29.

Coffee is drawn from the container through a faucet 33. The particles of ground coffee are held from the bottom by a cloth or screen 34 suspended from a ring 35 which is held in position by hooks 36.

The safety valve, clearly shown in Figure 4, consists of a thread nipple 37 which is received by a tapped hole in the cover 15. The nipple is provided with a seat 38 against which is forced a disc of malleable metal 39. This metal disc, before being placed against its seat, is concave, as is shown at $39^a$, Figure 6. It is flattened into the position shown at 39 by ramming, causing it to fit tightly against the walls of the nipple 37. A pressure within the container exceeding a suitable amount will blow out the metal disc and protect the urn from destruction. It is readily seen that in case the valve is blown, it is easily and quickly closed again by ramming in a new metal disc.

The automatic electric cut-out, shown in Figure 3, consists of a threaded pipe connection 40, supporting a protecting cage 41 and fitting a Bourdon tube 42. Mounted on the Bourdon tube 42 is a section of insulation 43, having binding posts 44 and 45 and a leaf spring 46. On the end of the leaf spring 46 is mounted a platinum point 47 which makes contact with another platinum point on the binding post 45. The leaf spring 46 operates against a spiral spring 48 fastened to an adjusting screw 49 on the Bourdon tube 42. As the pressure within the coffee urn increases, the Bourdon tube tends to straighten, lifting the leaf spring 46 and thereby opening the circuit through the heating element shown as the resistance 27.

It is understood that various changes in the details of construction may be made without departing from the spirit of my invention as set forth in the appended claims.

What I claim is:

1. In a coffee urn capable of making coffee under pressure, a safety blow-off valve using a rammed metal disc substantially as described.

2. In a coffee urn, the combination with an electrical heating element, of a safety blow-off valve including a rammed metal disc.

3. In a coffee urn, the combination of an electrical heating element, a pressure controlled automatic cut-off and a safety blow-off valve including a rammed metal disc.

In testimony whereof I have signed my name to this specification.

GEO. A. STOREY.